United States Patent
Heo et al.

(10) Patent No.: US 11,679,627 B2
(45) Date of Patent: Jun. 20, 2023

(54) NON-PNEUMATIC TIRE HAVING BLOCK TYPE REINFORCEMENT

(71) Applicant: HANKOOK TIRE & TECHNOLOGY CO., LTD, Seoul (KR)

(72) Inventors: Jeong Mu Heo, Daejeon (KR); Chang Young Sohn, Daejeon (KR); Seok Ju Choi, Daejeon (KR)

(73) Assignee: HANKOOK TIRE & TECHNOLOGY CO., LTD, Seoul (KR)

( * ) Notice: Subject to any disclaimer, the term of this patent is extended or adjusted under 35 U.S.C. 154(b) by 602 days.

(21) Appl. No.: 16/676,172

(22) Filed: Nov. 6, 2019

(65) Prior Publication Data

US 2020/0324576 A1 Oct. 15, 2020

(30) Foreign Application Priority Data

Apr. 15, 2019 (KR) .......................... 10-2019-0043537

(51) Int. Cl.
*B60C 7/22* (2006.01)

(52) U.S. Cl.
CPC ..................... *B60C 7/22* (2013.01)

(58) Field of Classification Search
CPC .. B60C 9/18; B60C 7/18; B60C 7/146; B60C 7/22
See application file for complete search history.

(56) References Cited

U.S. PATENT DOCUMENTS

| 884,821 A * | 4/1908 | Marks ..................... B26B 13/24 7/164 |
| 4,733,708 A * | 3/1988 | Kindry .................. B60C 9/0007 152/531 |
| 5,579,818 A * | 12/1996 | Hoppenheit ............. B60C 7/28 152/393 |
| 10,155,416 B2 * | 12/2018 | Iwamura .................. B60C 9/18 |
| 10,682,887 B2 * | 6/2020 | Sportelli ................... B32B 5/12 |
| 2006/0040077 A1 | 2/2006 | Wilson et al. |
| 2011/0308686 A1 | 12/2011 | Chaulet et al. |
| 2012/0031535 A1 * | 2/2012 | Thompson ............ B60C 99/006 152/151 |
| 2012/0305158 A1 * | 12/2012 | Hayashi ................ B60C 9/2204 152/527 |

(Continued)

FOREIGN PATENT DOCUMENTS

| CN | 102256809 A | 11/2011 |
| EP | 3159184 A1 | 4/2017 |
| JP | 2014008791 A | 1/2014 |

(Continued)

*Primary Examiner* — Scott A Browne
(74) *Attorney, Agent, or Firm* — Bridgeway IP Law Group, PLLC; Jihun Kim

(57) ABSTRACT

A non-pneumatic tire having a block type reinforcement configuration includes: a tread unit that forms an outer portion of the tire and comes in contact with a road surface; a wheel unit that is connected to an axle; a spoke unit that is formed between the tread unit and the wheel unit; and a block type reinforcement unit that includes a block formed inside the tread unit in the circumferential direction of the tread unit, and a plurality of reinforcing members formed in the block to correspond to the shape of the block.

5 Claims, 9 Drawing Sheets

(56) References Cited

U.S. PATENT DOCUMENTS

2012/0318417 A1\* 12/2012 Dotson ................ B60C 9/1807
152/17
2018/0134085 A1\* 5/2018 Miyazono ............. B60C 9/2009

FOREIGN PATENT DOCUMENTS

| | | | |
|---|---|---|---|
| JP | 2016179731 | A | 10/2016 |
| JP | 2019505430 | A | 2/2019 |
| KR | 10-1147859 | A | 5/2012 |
| KR | 2017-0048166 | A | 5/2017 |
| KR | 2018-0057547 | A | 5/2018 |
| WO | 2017111944 | A1 | 6/2017 |
| WO | 2018234989 | A1 | 12/2018 |
| WO | 2019126339 | A1 | 6/2019 |

\* cited by examiner

| | Ft.Shape(cm²) | Load Distribution |
|---|---|---|
| a |  | 1. Reinforcement: 91.51% / Spokes: 8.49%<br>2. Bottom: 46%/Upper: 54% |
| b |  | 1. Reinforcement: 95.41% / Spokes: 4.59%<br>2. Bottom: 42%/Upper: 58% |
| c |  | 1. Reinforcement: 96.42% / Spokes: 3.58%<br>2. Bottom: 37%/Upper: 63% |
| d |  | 1. Reinforcement: 97.31% / Spokes: 2.69%<br>2. Bottom: 35%/Upper: 65% |

NON-PNEUMATIC TIRE HAVING BLOCK TYPE REINFORCEMENT

CROSS-REFERENCE TO RELATED APPLICATION

This application claims priority to KR10-2019-0043537, filed Apr. 15, 2019, the disclosure of which is incorporated herein by reference in its entirety.

BACKGROUND OF THE INVENTION

Field of the Invention

The present invention relates to a non-pneumatic tire having a block type reinforcement configuration and, more particularly, to a technology that can improve rigidity of a non-pneumatic tire and can adjust the rigidity of the non-pneumatic tire by inserting a reinforcing member in the non-pneumatic tire.

Description of the Related Art

Recently, tread compound deformation, a non-pneumatic tire, or the like are mentioned as a technology for replacing radial tires of the related art. A pneumatic tire is a tire that is being developed the fastest of the tires mentioned as described above.

Attempts to improve the performance of non-pneumatic tires are being continuously made through development of the structure or the material of non-pneumatic tires, and particularly, studies for improving the shock absorption performance of non-pneumatic tires are increasingly conducted.

However, according to non-pneumatic tires of the related art, there is a limit in structurally improving rigidity or elasticity of the non-pneumatic tires and there is a problem in that the manufacturing process becomes complicated in order to improve the performance of non-pneumatic tires.

In Korean Patent No. 10-1147859 (title of invention: NON PNEUMATIC TIRE WITH REINFORCED SIDE-PIECE), there is disclosed a non-pneumatic tire that includes a tread 1 that comes in contact with a road surface, in which the tread 1 is composed of an elastic member 2 being in contact with the inside of the tread 1, a spoke unit 3 being in contact with the inside of the elastic member 2 and reinforced on the sides, and a wheel 4 disposed in contact with the inside of the spoke unit, in which the tread 1, the elastic member 2, the spoke unit 3, and the wheel 4 are physically and chemically combined at high pressure and temperature by inserting a dienic in polymer or an adhesive of polymers between them.

CITATION LIST

Patent Literature

Patent Literature 1: Korean Patent No. 10-1147859

SUMMARY OF THE INVENTION

In order to solve the problems described above, an object of the present invention is to improve rigidity of a non-pneumatic tire and can adjust the rigidity of the non-pneumatic tire by adding a configuration having a simple structure.

The objects to implement in the present invention are not limited to the technical problems described above and other objects that are not stated herein will be clearly understood by those skilled in the art from the following specifications.

In order to achieve the objects, a non-pneumatic tire having a block type reinforcement configuration includes: a tread unit that forms an outer portion of the tire and comes in contact with a road surface; a wheel unit that is connected to an axle; a spoke unit that is formed between the tread unit and the wheel unit; and a block type reinforcement unit that includes a block formed inside the tread unit in the circumferential direction of the tread unit and a plurality of reinforcing members formed in the block to correspond to the shape of the block, in which rigidity of the tread unit is adjusted by adjusting the number and position of the reinforcing members.

In an embodiment of the present invention, the reinforcing member may be formed in a wire shape.

In an embodiment of the present invention, the reinforcing member may be made of one or more materials selected from steel, glass fiber, or carbon fiber.

In an embodiment of the present invention, the block may be made of one or more materials selected from rubber, urethane, synthetic resin, or silicon.

In an embodiment of the present invention, the block may have a circular, rectangular, pentagonal, or uneven cross-sectional shape.

In an embodiment of the present invention, in the block, a reinforcing member layer may be formed by a plurality of reinforcing members, and one reinforcing member layer and another reinforcing member layer may have the same shape or different shapes.

In an embodiment of the present invention, one block type reinforcement unit and another block type reinforcement unit may be different in rigidity.

In an embodiment of the present invention, one block type reinforcement unit and another block type reinforcement unit may be different in arrangement position.

DETAILED DESCRIPTION OF THE PREFERRED EMBODIMENTS

Figure 1:
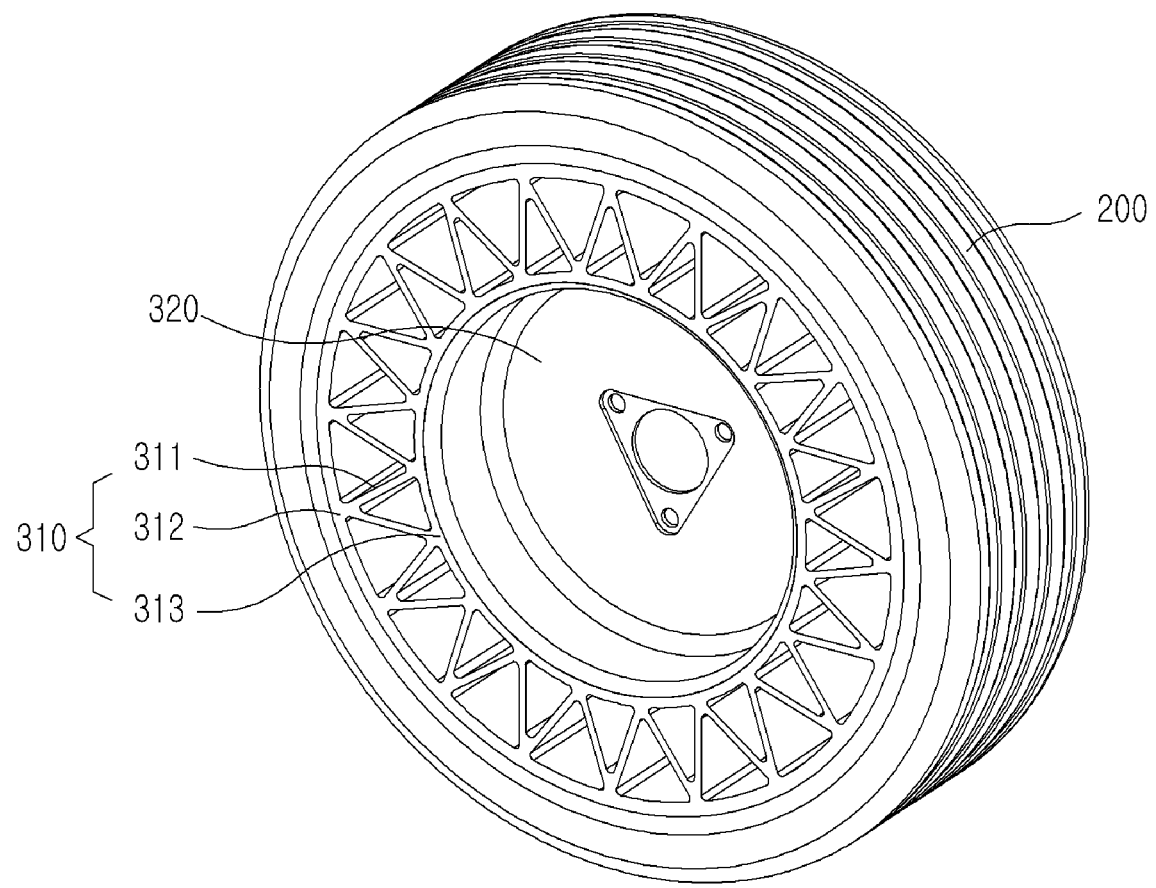
FIG. 1 is a perspective view of a non-pneumatic tire according to an embodiment of the present invention.

Hereinafter, the present invention is described with reference to the accompanying drawings. However, the present invention may be modified in various different ways and is not limited to the embodiments described herein. Further, in the accompanying drawings, components irrelevant to the description will be omitted in order to obviously describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

The terminology used herein is for the purpose of describing particular embodiments only and is not intended to limit the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, the present invention is described in detail with reference to the accompanying drawings.

Figure 2:
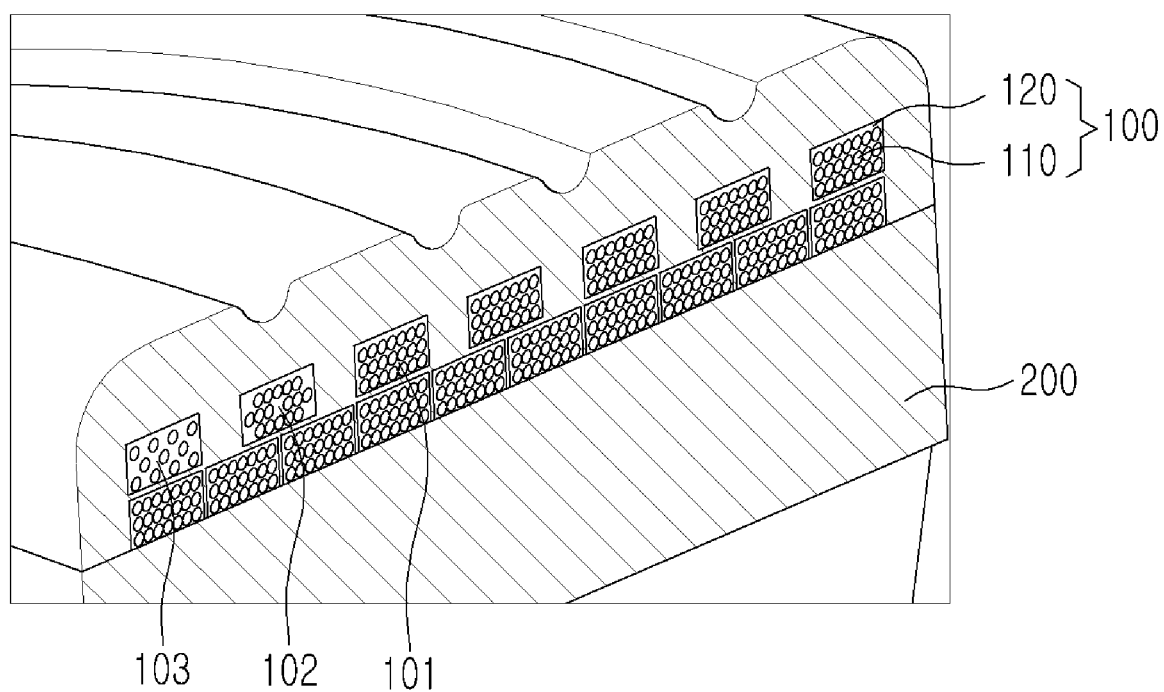
FIG. 2 is an enlarged view of a cross-section of a tread unit according to an embodiment of the present invention.

FIG. 1 is a perspective view of a non-pneumatic tire according to an embodiment of the present invention and FIG. 2 is an enlarged view of a cross-section of a tread unit 200 according to an embodiment of the present invention. As shown in FIGS. 1 and 2, a non-pneumatic tire according to an embodiment of the present invention includes: a tread unit 200 that forms an outer portion of the tire and comes in contact with a road surface; a wheel unit 320 that is connected to an axle; a spoke unit 310 that is formed between the tread unit 200 and the wheel unit 320; and a block type reinforcement unit 100 including a block 120 formed inside the tread unit 200 in the circumferential direction of the tread unit 200 and a plurality of reinforcing members 110 formed in the block 120 to correspond to the shape of the block 120.

The wheel unit 320 may be made of metal or synthetic resin and may be formed in a disc shape. However, the shape of the wheel unit 320 is not limited thereto and various shapes such as the shapes of wheels with which common tires are combined may be used.

Further, the spoke unit 310 may be made of synthetic resin and may include an outer band 312 having a cylindrical shape and coupled to the tread unit 200, an inner band 313 having a cylindrical shape and coupled to the wheel unit 320, and a plurality of spokes 311 forming repeated shapes between the outer band 312 and the inner band 313 and coupled to the outer band 312 and the inner band 313.

Further, the tread unit 200 has a ring-shaped band shape, is coupled to the outer side of the outer band 312, and can come in contact with a road surface. In this configuration, the tread unit 200 may be made of synthetic resin.

The reinforcing member 110 may be formed in a wire shape. Further, the reinforcing member 110 may be made of one or more materials selected from steel, glass fiber, or carbon fiber. Although the cross-section of the wire-shaped reinforcing member 110 has a circular shape in an embodiment of the present invention, the present invention is not limited thereto and the cross-section of the reinforcing member 110 may be formed in a polygonal shape or an elliptical shape.

As shown in FIG. 2, the block 120 may have a ring shape formed inside the tread 200 in the circumferential direction of the tread 200, and the ire-shaped reinforcing member 110 may be formed to correspond to the tread unit 200 and may be inserted in the block 120. The reinforcing member 110 may be made of the material described above, and a plurality of reinforcing members 110 made of the same material may be formed in one block 120. Further, a plurality of reinforcing members 110 made of different materials may be formed in one block 120.

The block 120 may be made of one or more materials selected from rubber, urethane, synthetic resin, or silicon. In detail, the block 120 may be made of one or more materials selected from EPDM rubber, urethane, or silicon. Further, the block 120 may be made of a compound of two or more materials selected from EPDM rubber, urethane, or silicon. That is, the block 120 may be made of a material having elasticity.

In the block 120, the reinforcing members 110 may be in contact with each other, or the reinforcing members 110 may be spaced apart from each other. When the reinforcing members 110 are in contact with each other, the supporting force between the reinforcing members 110 is increased, so the rigidity of the block type reinforcement unit 100 itself can be improved and the ability to maintain the shape of the tread unit 200 can be increased. Further, when the reinforcing members 110 are spaced apart from each other, the block 120 having elasticity is formed between the reinforcing members 110, so torsion strength can be improved.

The block 120 may have a circular, rectangular, pentagonal, or uneven cross-sectional shape. The uneven shape may be a shape in which prominences and depressions are formed on the surface of the block 120. When the cross-section of the block 120 is formed in this way, it is easy to form a block type reinforcement unit layer composed of a plurality of block type reinforcement units 100 such that the cross-sections of the blocks 120 are arranged in a line. Further, when another block type reinforcement unit layer is formed adjacent to one block type reinforcement unit layer, rigidity of portions of the tread unit 200 can be increased.

In the block 120, a plurality of reinforcing members 110 may be arranged to form a layer. As shown in FIG. 2, a reinforcing member layer composed of a plurality of reinforcing members 110 may be formed in the block 120 such that the cross-sections of the plurality of reinforcing members 110 are arranged in a line, and another reinforcing member layer may be formed adjacent to one reinforcing member layer. Further, the reinforcing member layer and another reinforcing member layer may have the same shape or different shapes.

In detail, as in a first block type reinforcement unit 101 shown in FIG. 2, seven reinforcing members 110 may be formed such that the cross-sections are arranged in a line in one reinforcing member layer, and another adjacent reinforcing member layer may be formed in the same way. Alternatively, as in a second block type reinforcement unit 102 shown in FIG. 2, five reinforcing members 110 may be formed such that the cross-sections are arranged in a line in one reinforcing member layer, and in another adjacent reinforcing member layer, three reinforcing members 110 may be formed such that the cross-sections are arranged in a line and other three reinforcing members 110 may be formed such that the cross-sections are arranged in a line with a gap from the previous three reinforcing members. Alternatively, as in a third block type reinforcement unit 103 shown in FIG. 2, reinforcing members 110 may be formed to be uniformly spaced apart from each other.

In the non-pneumatic tire of the present invention, it is possible to adjust the rigidity of portions of the tread unit 200 by adjusting the number and position of the reinforcing members 110. As in the first to third block type reinforcement units 101-103, in each reinforcing member layer, it is possible to form reinforcing member layers having different shapes by adjusting the number and position of the reinforcing members 110 and it is possible to form the block type reinforcement unit 100 by combining the reinforcing member layers having different shapes. Accordingly, the number and position of the reinforcing members 110 are adjusted in the block type reinforcement unit 100 and the density of the reinforcing members 110 in the blocks 120 are also adjusted, so the rigidity by a plurality of block type reinforcement units 100 is adjusted. Therefore, the rigidity of the tread unit 200 can be adjusted, and accordingly, the rigidity of the non-pneumatic tire of the present invention can be adjusted.

In the non-pneumatic tire of the present invention, the rigidity of one block type reinforcement unit 100 and the rigidity of another block type reinforcement unit 100 may be different. In detail, as shown in FIG. 2, the first to third block type reinforcement units 101-103 are different in the number and position of the reinforcing members 110, and accordingly, the first to third block type reinforcement units 101-103 may be different in rigidity. Further, by combining and putting a plurality of block type reinforcement units 100 being different in rigidity into the tread unit 200, it is possible to adjust the rigidity of the tread unit 200 by adjusting the combination of the block type reinforcement units 100, and accordingly, it is possible to adjust the rigidity of the non-pneumatic tire of the present invention.

In the non-pneumatic tire of the present invention, the arrangement position of one block type reinforcement unit 100 and the arrangement position of another block type reinforcement unit 100 may be different. In detail, as shown in FIG. 2, in a set of block type reinforcement unit 100 divided into an upper layer and a lower layer, one block type reinforcement unit 100 may be arranged in the upper layer and another block type reinforcement unit 100 may be arranged in the lower layer. Further, one block type reinforcement unit 100 and another block type reinforcement unit 100 may be arranged to be spaced apart from each other in the upper layer, and one block type reinforcement unit 100 and another block type reinforcement unit 100 may be arranged adjacent to each other in the lower layer. Further, one block type reinforcement unit 100 and another block type reinforcement unit 100 may be arranged in parallel or orthogonally.

Further, although one block type reinforcement unit 100 and another block type reinforcement unit 100 are both formed in the circumferential direction of a tire in the description of an embodiment of the present invention, the present invention is not limited thereto and any one block type reinforcement unit 100 may be formed at an angle with respect to the circumferential direction of the tire.

Figure 3:
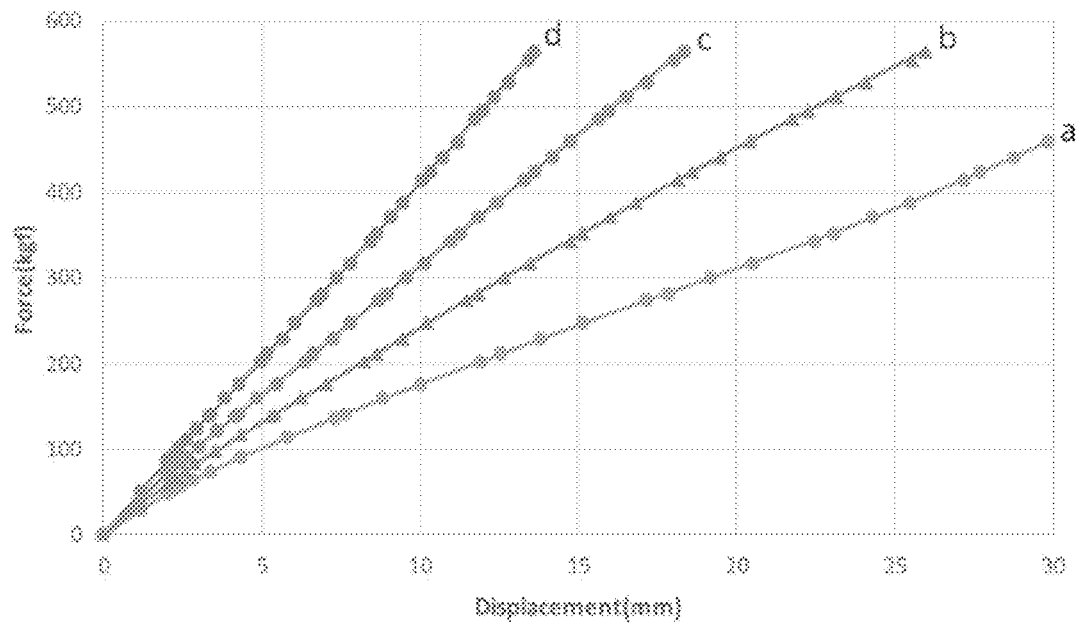
FIG. 3 is a graph showing a change of vertical rigidity of a non-pneumatic tire according to the number of block type reinforcement units according to an embodiment of the present invention.

FIG. 3 is a graph showing a change of vertical rigidity of a non-pneumatic tire according to the number of block type reinforcement units 100 according to an embodiment of the present invention. In this case, the vertical rigidity change may mean the amount of deformation of a non-pneumatic tire when a varying vertical load applied to the a non-pneumatic tire. In FIG. 3, the graph 'a' is a vertical rigidity change graph of a non-pneumatic tire without the block type reinforcement unit 100, the graph 'b' is a vertical rigidity change graph of a non-pneumatic tire including the block type reinforcement unit 100, and the graph 'c' is a vertical rigidity change graph of a non-pneumatic tire including reinforcing members 110 in double in comparison to the non-pneumatic tire of the graph V. Further, the graph 'd' is a vertical rigidity change graph of a non-pneumatic tire including reinforcing members 110 in four times in comparison to the non-pneumatic tire of the graph 'b'.

As shown in FIG. 3, in the non-pneumatic tire, it can be seen that as the number of the reinforcing members 110 increases, the rigidity of the non-pneumatic tire increases. Accordingly, it can be seen that when the block type reinforcement unit 100 is formed in the non-pneumatic tire, the rigidity of portions of the non-pneumatic tire increases, so the durability of the non-pneumatic tire increases and the ability to maintain the shape is improved, whereby stability increases.

Figure 4A:
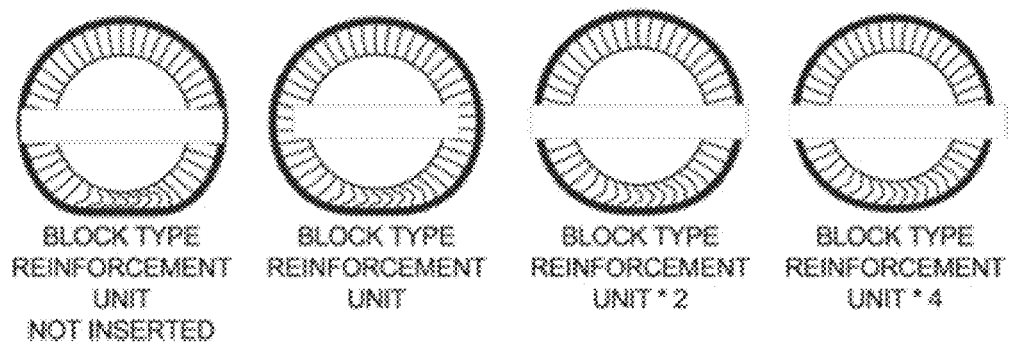
FIGS. 4A and 4B are images and a table showing deformation, contact area images, and relevant numerical values of a non-pneumatic tire according to the number of block type reinforcement units according to an embodiment of the present invention.
Figure 4B:
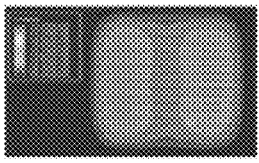
Figure 4B:
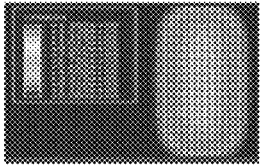
Figure 4B:
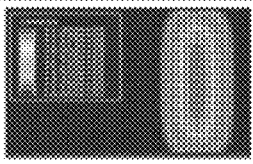
Figure 4B:
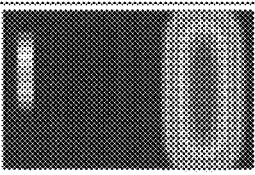

FIGS. 4A and 4B are images and a table showing deformation, contact area images, and relevant numerical values of a non-pneumatic tire according to the number of block type reinforcement units 100 according to an embodiment of the present invention. In this case, FIG. 4A shows images of deformation of tires 'a' to 'd' when an external load is applied to the tires 'a' to 'd'. Further, in FIG. 4B, the images in the column of the left Ft.Shape are images of contact areas on the ground of the tires 'a' to 'd' and the right column of Load Distribution is a table showing numerical numbers related to the tires 'a' to 'd'. In the images arranged at the left side in FIG. 4B, the sections discriminated by colors may mean pressure distribution in corresponding tires. Higher pressure is shown in order of blue-green-yellow-red.

As shown in FIG. 4A, the tire 'a' is a tire with the block type reinforcement units 100 removed from the non-pneumatic tire of the present invention, the tire 'b' is a tire including the block type reinforcement units 100 of the present invention, and the tire 'c' is a tire including block type reinforcement units 100 in double in a non-pneumatic tire of the present invention. Further, the tire 'd' is a tire including block type reinforcement units 100 in four times in a non-pneumatic tire of the present invention.

As shown in FIG. 4A, it can be seen that when the same magnitude of external load is applied to the tires 'a' to 'd', the deformation of the tire 'a' is the largest and the deformation of the tire 'd' is the smallest. Further, as shown in the column Ft.Shape in FIG. 4B, it can be seen there is no red section in the tire 'a' and red sections are increased in order of tire 'b'-tire 'c'-tire 'd', so the contact area decreases and shape deformation is small under a load in order of tire 'a'-tire 'b'-tire 'c'-tire 'd'. Accordingly, it can be seen that when the number of the block type reinforcement unit 100 is increased in the non-pneumatic tire, the rigidity of portions of the non-pneumatic tire increases, so the durability of the non-pneumatic tire increases and the ability to maintain the shape is improved, whereby stability increases.

In the column Load Distribution in FIG. 4B, in the load distribution ratio of the spoke unit 310 and the other portion except for the spoke unit 310 of the tire, the numerical value of Spokes may mean the ratio of the load distributed in the spoke units 310 of the tires and the numerical value of Reinforcement may mean the ratio of the load distributed in the other portion except for the spoke units 310 of the tires.

Further, in the load distribution ratio of a grounding portion and a non-grounding portion of the tires, the numerical value of Bottom may mean the ratio of the load distributed in the grounding portion of the tires and the numerical value of Upper may mean the ratio of the load distributed in the non-grounding portion of the tires.

In FIG. 4B, as shown in the column Load Distribution, it can be seen that, under the same load, the numerical value of Reinforcement increases and the numerical value of Spokes decreases in order of tire 'a'-tire 'b'-tire 'c'-tire 'd'.

Further, it can be seen that, under the same load, the numerical value of Bottom decreases and the numerical value of Upper increases in order of 'a'-tire 'b'-tire 'c'-tire 'd'.

Accordingly, in the tires 'a' to the more the number of the block type reinforcement units 100, the smaller the load distributed in the spoke unit 310 and the smaller the load distributed in the grounding portion, so it can be seen that the durability of the non-pneumatic tire of the present invention is improved by an increase in number of the block type reinforcement units 100.

Hereafter, the manufacturing cost of a non-pneumatic tire of the present invention is described.

Figure 5A:
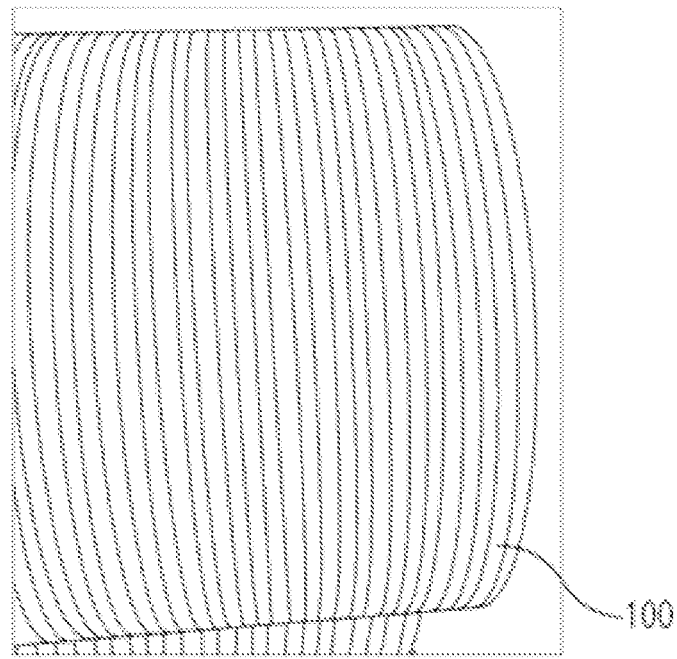
FIGS. 5A-5B, 6A-6D, and 7A-7C are images about a manufacturing process of a non-pneumatic tire according to an embodiment of the present invention.
Figure 5B:
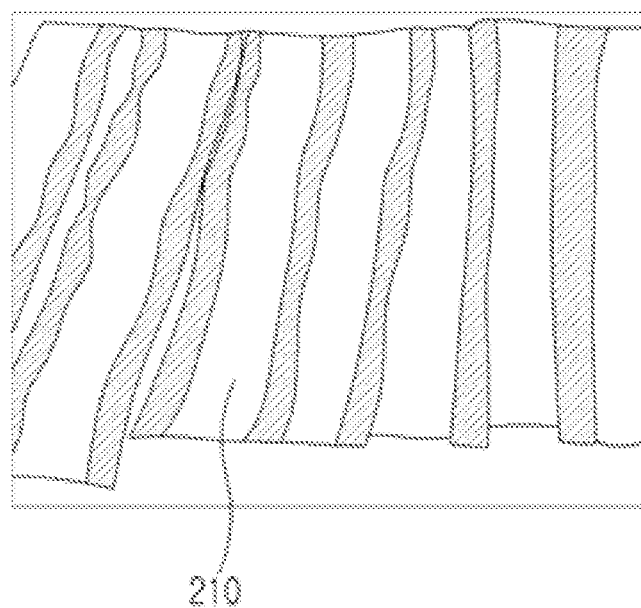

FIGS. 5A-5B, 6A-6D, and 7A-7C are images about a manufacturing process of a non-pneumatic tire according to an embodiment of the present invention. In this case FIG. 5A is an image when the block type reinforcement units 100 are prepared, overlapping each other, and FIG. 5B is an image of a tread base 210 that is used to form the tread unit 200.

Figure 6A:
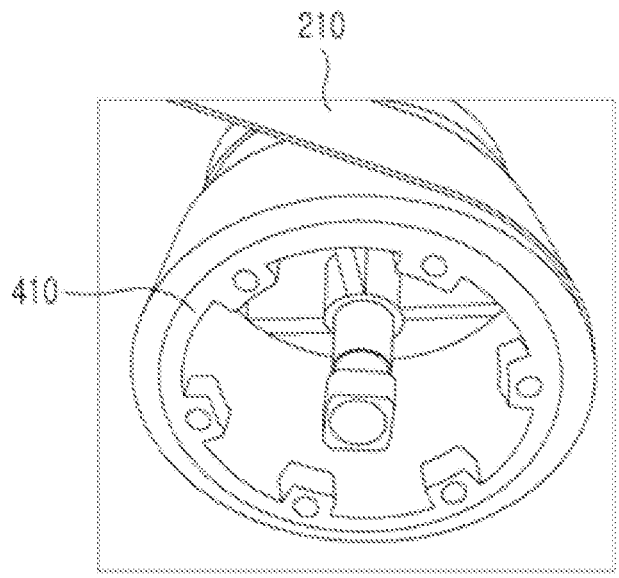
Figure 6B:
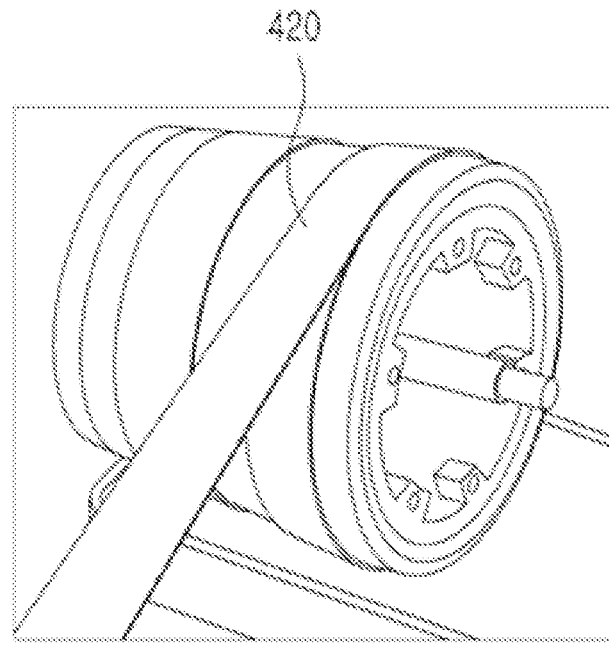
Figure 6C:
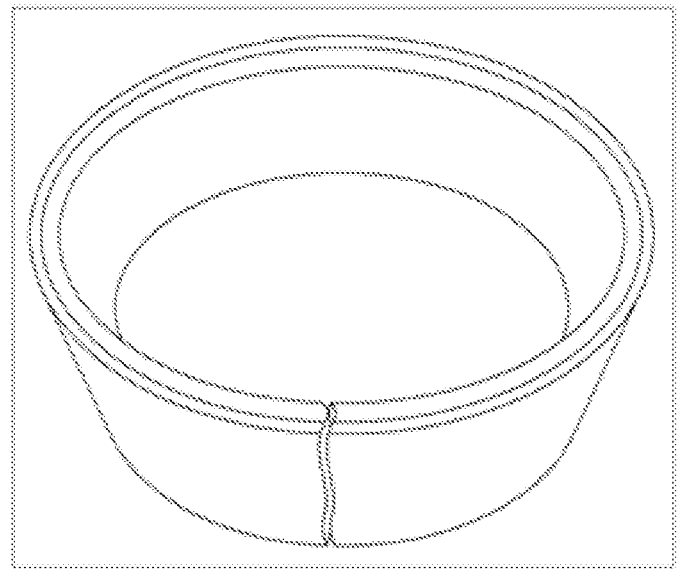
Figure 6D:
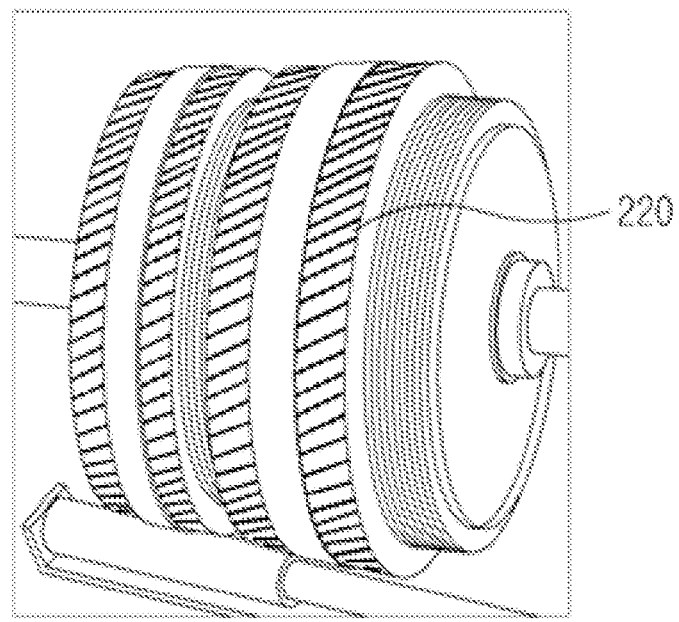

FIG. 6A is an image about a process of combining the block type reinforcement units 100 and the tread base 210, FIG. 6B is an image about a process of wrapping a curing tape 420 on the block type reinforcement units 100 and the tread base 210, and FIG. 6C is an image about an assembly of the block type reinforcement units 100 and the tread base 210. Further, FIG. 6D is an image about a process of coupling an outer tread 200 to the assembly of the block type reinforcement units 100 and the tread base 210.

Figure 7A:
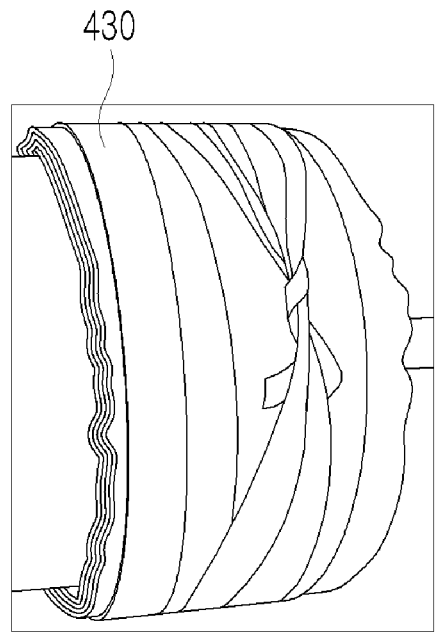
Figure 7B:
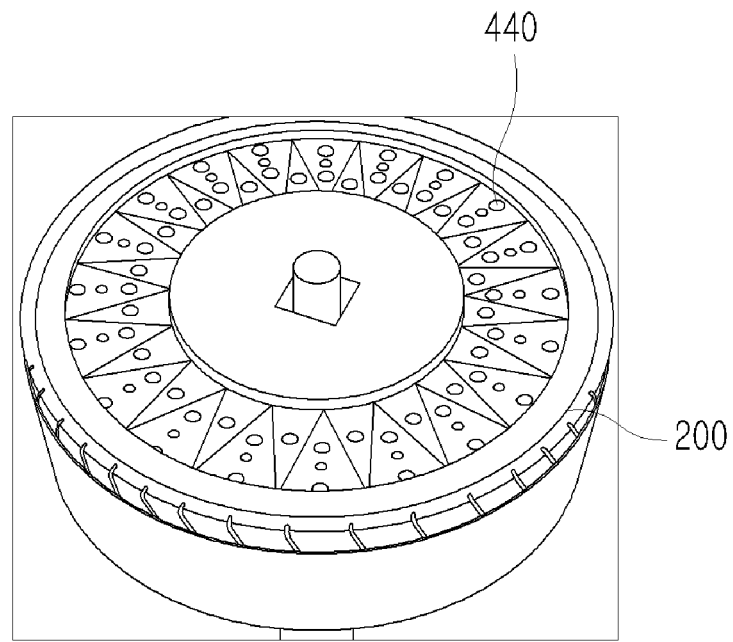
Figure 7C:
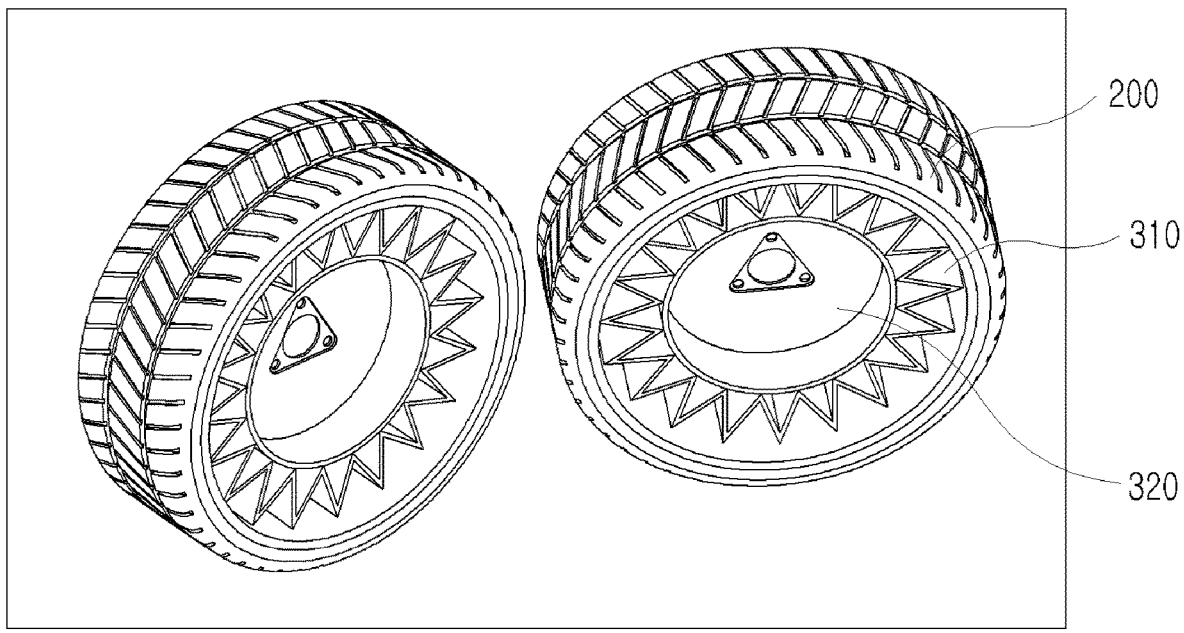

FIG. 7A is an image of an assembly of the block type reinforcement units 100, the tread base 210, and the outer tread 220 covered with a thermal protective cover 430, FIG. 7B is an image about forming the spoke unit 310, and FIG. 7C is an image about a completed non-pneumatic tire of the present invention.

As shown in FIGS. 5A and 5B, first, in the first step, block type reinforcement units 100 and a tread base 210 may be prepared to form the block type reinforcement units 100 in a tread 200.

In the second step, as shown in FIG. 6A, the block type reinforcement units 100 and the tread base 210 may be combined. In this case, it is possible to put the tread base 210 on the outer surface of a cylindrical drum 410, wind the tread base 210 several times by rotating the cylindrical drum 410, couple the block type reinforcement unit 100 to the outer surface of the wound tread base 210, and then wind the block type reinforcement unit 100 several time by rotating the cylindrical drum 410. Thereafter, it is possible to form a temporal assembly of the block type reinforcement unit 100 and the tread base 210 by coupling the wound block type reinforcement unit 100 to the tread base 210 and then winding the tread base 210 several times by rotating the cylindrical drum 410. In this configuration, the tread base 210 may be made of resin or synthetic resin.

In the third step, as shown in FIG. 6B, a curing tape is wrapped on the temporal assembly of the block type reinforcement unit 100 and the tread base 210 and then the wrapped temporal assembly of the block type reinforcement unit 100 and the tread base 210 can be put into an oven for a tire and heated therein. Accordingly, heat and pressure are provided to the temporal assembly of the block type reinforcement unit 100 and the tread base 210, so the block type reinforcement unit 100 and the tread base 210 are completely combined, whereby an assembly of the block type reinforcement unit 100 and the tread base 210 can be formed.

In the fourth step, as shown in FIG. 6D, a temporal tread unit is formed by coupling the outer surface of the temporal assembly of the block type reinforcement unit 100 and the tread base 210 to the outer tread 220. In this case, the outer tread 220 forms the outer portion of the tread unit 200 and may be made of rubber or synthetic resin. Further, block, cuffs, or grooves may be formed on the outer surface of the outer tread 220 that comes in contact with the ground.

In the fifth step, as shown in FIG. 7A, the temporal tread unit is covered with the thermal protective cover 430, and then the protective temporal tread unit can be put into an oven for a tire and heated therein. Accordingly, heat and pressure are provided to the assembly of the block type reinforcement unit 100 and the tread base 210, and the outer tread 220, so the block type reinforcement unit 100 and the tread base 210 are completely combined, whereby the tread unit 200 shown in FIG. 7B can be formed.

In the sixth step, as shown in FIG. 7A, a wheel unit 320 can be put inside the tread unit 200 and a spoke-forming frame 440 can be put in between the tread unit 200 and the wheel unit 320. In this configuration, in order to form the outer band 312 and the inner band 313, the spoke-forming frame 440 may be spaced apart for a predetermined distance from the tread unit 220 and the wheel unit 320, respectively. Further, a spoke unit-forming material (synthetic resin) for forming the spokes 311, the outer band 312, and the inner band 313 may be injected into the spaced space and the internal space of the spoke-forming frame 440. Further, the spoke unit-forming material may be cured.

It is possible to manufacture the non-pneumatic tire of the present invention shown in FIG. 7C through these processes.

An effect of the present invention configured as described above is to be able to improve rigidity of a non-pneumatic tire and adjust the rigidity of the non-pneumatic tire by inserting a reinforcing member in the non-pneumatic tire.

Further, another effect of the present invention is that the shock absorption performance and durability of a non-pneumatic tire are improved because a load is distributed in the non-pneumatic tire by inserting a reinforcing member in the non-pneumatic tire.

The effects of the present invention are not limited thereto and it should be understood that the effects include all effects that can be inferred from the configuration of the present invention described in the following specification or claims.

The above description is provided as an exemplary embodiment of the present invention and it should be understood that the present invention may be easily modified in other various ways without changing the spirit or the necessary features of the present invention by those skilled in the art. Therefore, the embodiments described above are only examples and should not be construed as being limitative in all respects. For example, the components described as single parts may be divided and the components described as separate parts may be integrated.

The scope of the present invention is defined by the following claims, and all of changes and modifications obtained from the meaning and range of claims and equivalent concepts should be construed as being included in the scope of the present invention.

What is claimed is:

1. A non-pneumatic tire having a reinforcement configuration, the non-pneumatic tire comprising:
   a tread forming an outer portion of the tire to come in contact with a road surface;
   a wheel connected to an axle;
   a spoke disposed between the tread and the wheel; and
   a reinforcement unit including a plurality of blocks disposed inside the tread in a circumferential direction of the tread, each of the plurality of blocks having a plurality of reinforcing members disposed therein, the plurality of reinforcing members disposed in each block forming two or more layers of reinforcing members, each of the plurality of reinforcing members being in a wire shape, wherein rigidity of the tread is adjusted by adjusting a number and position of the plurality of reinforcing members, wherein the plurality of blocks are arranged in upper and lower rows, and wherein a first set of blocks arranged in the upper row are spaced apart at a first distance, and a second set of blocks arranged in the lower row are spaced apart at a second distance, the first distance being different from the second distance.

2. The non-pneumatic tire of claim 1, wherein the plurality of reinforcing members are made of one or more materials selected from steel, glass fiber, or carbon fiber.

3. The non-pneumatic tire of claim 1, wherein the plurality of blocks are made of one or more materials selected from rubber, urethane, synthetic resin, or silicon.

4. The non-pneumatic tire of claim 1, wherein each of the plurality of blocks has a circular, rectangular, pentagonal, or uneven cross-sectional shape.

5. The non-pneumatic tire of claim 1, wherein, in each of the plurality of blocks, one layer of reinforcing members and another layer of reinforcing members have different shapes or arrangements from each other.

\* \* \* \* \*